E. C. KELLY, Jr.
SEPARATOR.
APPLICATION FILED JAN. 19, 1916.

1,200,951.

Patented Oct. 10, 1916.

Inventor:
Edward C. Kelly, Jr.

UNITED STATES PATENT OFFICE.

EDWARD C. KELLY, JR., OF BOSTON, MASSACHUSETTS, ASSIGNOR TO KELLY SEPARATOR COMPANY, OF BOSTON, MASSACHUSETTS, A CORPORATION OF MASSACHUSETTS.

SEPARATOR.

1,200,951. Specification of Letters Patent. Patented Oct. 10, 1916.

Application filed January 19, 1916. Serial No. 72,923.

*To all whom it may concern:*

Be it known that I, EDWARD C. KELLY, Jr., citizen of the United States, and resident of Boston, in the county of Suffolk and State of Massachusetts, have invented new and useful Improvements in Separators, of which the following is a specification.

This invention relates to traps or separators for use in garages, machine shops and the like, adapted to separate grease, oils, etc., from drainage or wash water and thus prevent its passage into drains and sewers.

The object of the invention is to provide a trap or separator of this general type, wherein effective means are provided to permit the water which gathers from time to time in the grease and oil collector to flow back into the trap so that the said collector may be utilized to full capacity.

Figure 2:
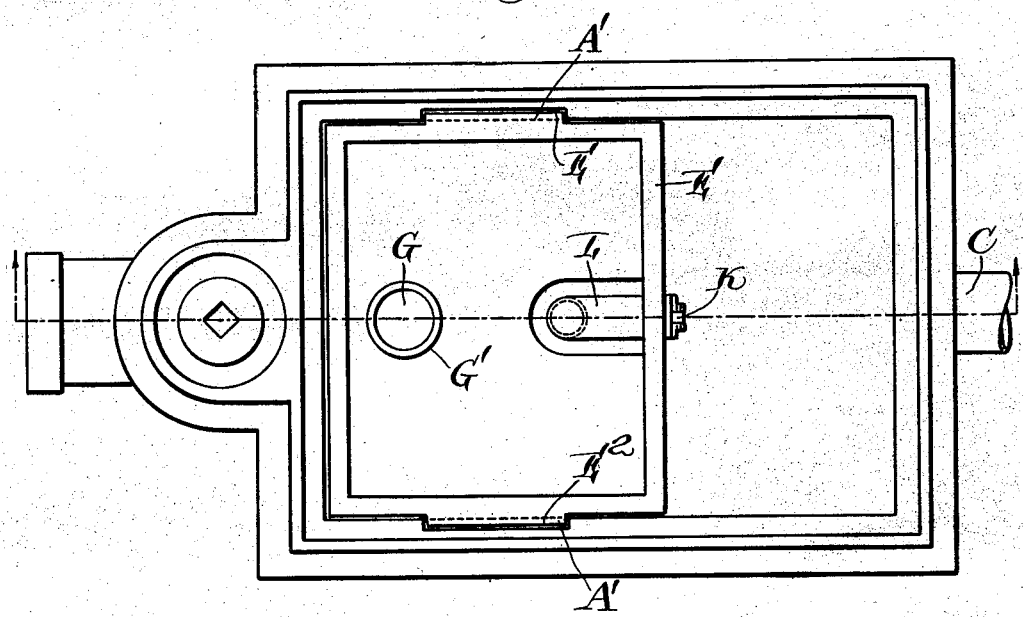
Figure 1:
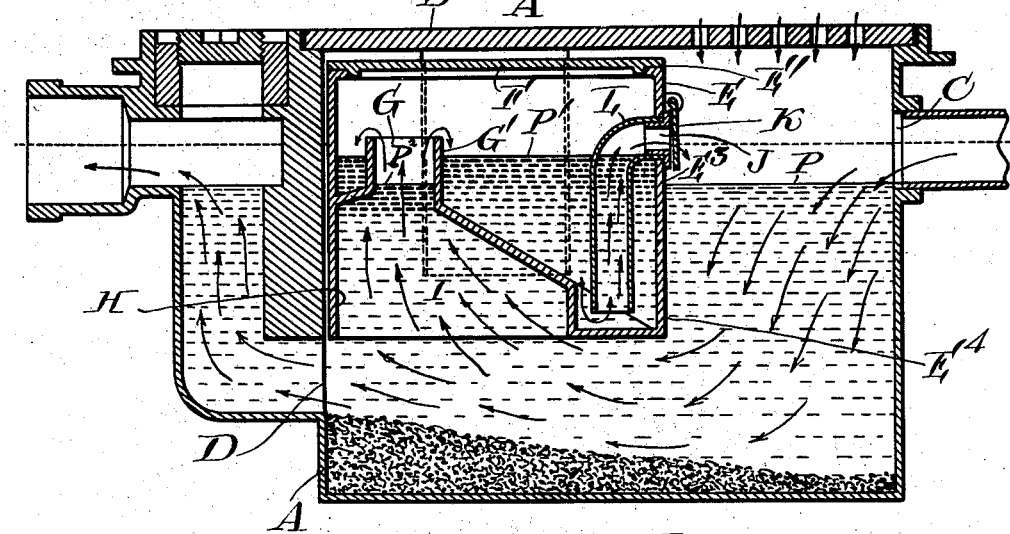

Referring to the drawings which illustrate an embodiment of my invention, Figure 1 is a vertical, longitudinal section of my improved trap; and Fig. 2 is a top plan view with the covers removed.

In the drawing, A is the body of the trap having a removable cover B, and provided at one end with an inlet C and at its opposite end with an outlet D.

E is the grease and oil collector located within the trap A and intermediate the inlet C and outlet D. The said collector E is preferably made in a single casting with a seat E' around its upper edge upon which the cover F is placed. Preferably also, the collector has a pair of lateral flanges $E^2$ (Fig. 2) adapted to engage notches A' in the side walls of the trap whereby the said collector is removably secured within the trap.

The bottom of the collector E is provided with an inlet G having a wall G' which projects within the collector above the normal level, P, of liquids in the tank. Preferably the said wall G' is formed integral with the bottom of the collector which slopes upward toward said inlet G and has a depending skirt or grease dam H. The chamber I, formed by the said wall G', inclined bottom and dam H, is the intercepting chamber in which the grease and oil gathers before passing into the collector E in the manner presently to be described.

In the side wall $E^3$ of the collector E upon the inlet side of the trap, and below the plane of the top of the wall G', is an outlet J provided with a normally open valve K pivoted on the outside of said wall $E^3$. It will be observed that the said valve K is located a comparatively short distance above the normal level, P, of liquids within the tank, so that upon the inrush of liquids through the inlet C and consequent rising of the level in the tank, the valve will be closed and held in closed position until the liquids within the tank have returned to approximately normal level. A conduit or pipe L extending downward from said outlet J has its open lower end in proximity to the bottom of the collector E, which is preferably provided with a pocket $E^4$ into which the lower open end of the pipe extends.

The operation is as follows: Water having grease or oil mixed therewith enters the trap through the inlet C, and the oil or grease rises and gathers in the intercepting chamber I, the normal level of liquids in said chamber being indicated at $P^2$. Upon the entrance of a fresh quantity of liquid, the static balance is momentarily disturbed, and the liquids in the chamber I rise momentarily above the top of the wall G' and overflow into the collector E. It will be clear that in this overflow from the intercepting chamber some water will necessarily pass with the grease or oil into the collector. It will be equally clear that the water thus flowing into the collector will pass to the bottom, the lighter oils and liquids remaining at the top so that the pipe L having its open end in proximity to the bottom of the collector will in service become filled with the water which has overflowed into the collector by repeated disturbance of the static balance as above described. When, therefore, in service the liquids in the collector reach normal level P', the pipe L will be filled with water as shown in Fig. 1, and the collector proper with oil and water, the former at the top and the latter at the lower levels. When now a fresh quantity of liquids enter the trap, the level of liquids therein will be raised, closing the valve K and holding it in closed position. The overflow from the intercepting chamber resulting from the disturbance of the static balance will raise the level of liquids in the collector above the normal P', where it will remain until the level of liquids in the trap falls below the valve K permitting it to return to normal open position, whereupon the water in the pipe L will flow through the outlet J until the normal level P' is restored. Thus, upon each inrush of liquids into the tank a considerable quantity of water is expelled from the collector so that its entire capacity, or approximately so, may be utilized for the collection of oils and greases.

I claim—

1. The combination with a grease trap having an inlet and an outlet, of an intercepting chamber intermediate between the inlet and outlet, a collector connected with said intercepting chamber, and an outlet conduit leading upward from the lower part of said collector and delivering into the interior of said trap.

2. The combination with a grease trap having an inlet and an outlet, of an intercepting chamber intermediate between the inlet and outlet, a collector connected with said intercepting chamber and an outlet conduit leading upward from the lower part of said collector and delivering into the interior of said trap at a point above the normal level of liquid in the trap.

3. The combination with a grease trap having an inlet and an outlet, of an intercepting chamber intermediate between the inlet and outlet, and a collector connected with said chamber and having an outlet whereby water entering said collector from said chamber can flow back into the trap, and means adapted to be actuated by the liquids in said trap to close said outlet.

4. The combination with a grease trap having an inlet and an outlet, of an intercepting chamber intermediate between the inlet and outlet, and a collector having an inlet to permit the entrance of liquids from said chamber, and an outlet located below the plane at which the liquids enter the said collector, a conduit extending from said outlet and having an open end in proximity to the bottom of the collector, and a closure for said outlet.

5. The combination with a grease trap having an inlet and an outlet, of a collector in said trap intermediate between the inlet and outlet, said collector having an upwardly sloping bottom, a dam, and an inlet, the wall of which projects into the collector above the normal level of liquids in the trap, said bottom, dam and inlet wall forming an intercepting chamber, an outlet in the wall of the collector on the inlet end of the trap and below the plane of the top of said inlet wall, a conduit extending from said inlet and having an open end in proximity to the bottom of the collector, and a movable closure for said outlet.

6. The combination with a grease trap having an inlet and an outlet, of an intercepting chamber intermediate between the inlet and outlet, a collector having an inlet to permit the entrance of liquids from said chamber, and an outlet conduit leading upward from the lower part of said collector and delivering into the interior of said trap at a point below the plane at which the liquids enter the said collector.

7. The combination with a grease trap having an inlet and an outlet, of an intercepting chamber intermediate between the inlet and outlet, a collector having an inlet to permit the entrance of liquids from said chamber, and an outlet conduit leading upward from the lower part of said collector and delivering into the interior of said trap at a point below the plane at which the liquids enter the said collector and above the normal level of liquids in the trap.

Signed by me at Boston, Massachusetts, this fourteenth day of January, 1916.

EDWARD C. KELLY, Jr.